3,551,393
PREPARATION OF WATER SOLUBLE POLYMERIC VINYL AROMATIC SULFONATES
Thaddeus M. Muzyczko, Melrose Park, Samuel Shore, Roselle, and Sanford Schulert, Chicago, Ill., assignors to The Richardson Company, Melrose Park, Ill., a corporation of Ohio
No Drawing. Filed June 13, 1967, Ser. No. 645,588
Int. Cl. C08f 27/07
U.S. Cl. 260—79.3          5 Claims

ABSTRACT OF THE DISCLOSURE

The invention is directed to the preparation of water soluble, polymeric, vinyl aromatic sulfonates in high yields and without appreciable formation of insoluble sulfones. Illustrative of the water soluble sulfonates is a water soluble polystyrene sulfonate. The process utilizes a polymeric vinyl aromatic suspended in a reaction medium, a sulfonating agent and a phosphoric acid as a sulfone inhibitor.

BACKGROUND

This invention relates to an improved process for making water soluble polymeric vinyl aromatic sulfonates and particularly to an improved process wherein sulfone formation is reduced to a very low value so that the resultant sulfonated polymer is essentially completely water soluble. The products of the process are useful as dispersants, adhesive tackifiers, polymeric intermediates for subsequent grafting reactions and as dilatant additives for metal cleaning.

A number of processes for preparing water soluble polymeric vinyl aromatic sulfonates are known. However, these have not been completely satisfactory for various reasons. In some instances monomeric vinyl aromatics are sulfonated and then polymerized to produce products limited in yield by the several process steps. Other techniques employ the use of chlorosulfonic acid under high dilution and under reduced temperature conditions with a vinyl aromatic polymer in solution, but several process steps are needed and it is usually difficult to make completely water soluble polymers from polymeric starting materials that have molecular weights over approximately 50,000. Still other techniques employ the use of silver sulfate as a sulfone inhibitor in concentrated sulfuric acid solution. However, silver sulfate is expensive and the polystyrene must be added slowly to the reaction mixture as a fine dispersion. In addition, in this process, yields are generally low and sulfone formation is not usually reduced to very low limits.

One object of our invention is a process for preparing water soluble, polymeric vinyl aromatic sulfonates wherein sulfone formation is reduced to a very low value. Another object of this invention is the preparation of water soluble sulfonates in high yields. Still another object is the preparation of these sulfonates in a manner which facilitates recovery of the product. Other objects of the invention will become apparent in the detailed description below.

We have discovered that water soluble, polymeric vinyl aromatic sulfonates can be prepared from vinyl aromatic polymers in a suspension reaction by the use of a sulfonating agent milder than $SO_3$ in combination with a phosphoric acid as a sulfone inhibitor which enables low temperatures and shorter reaction times. The process is characterized by high yields of the water soluble sulfonates and by reduced sulfone formation to very low values. In addition, the process provides a medium from which the product can be readily recovered.

DETAILED DESCRIPTION

The process produces a polymeric vinyl aromatic sulfonate which is water soluble and useful for the purposes described above. The sulfonate is intended to include both the acid and salts thereof. In most instances, the yields of the water soluble polymer are close to quantitative and sulfone formation is limited to very low values in the order of 0.1%. With low sulfone formation, cross linking in the polymer is essentially avoided.

The process comprises reacting a vinyl aromatic polymer such as polystyrene suspended in a reaction medium with a sulfonating agent milder than $SO_3$ in the presence of a phosphoric acid as a sulfone inhibitor to produce the desired water soluble polymer.

Suitable vinyl aromatic polymers include styrene polymers such as polystyrene, polyvinyltoluene and polymers of polynuclear aromatics such as polyvinylnaphthalene and polyvinylcarbazole. Advantageously, the polymer is a styrene polymer and preferably polystyrene. The polymer is usually of medium molecular weight and commonly in the order of 10,000–3,000,000 as determined by DSV.

The polymer to be sulfonated forms a suspension in the reaction medium and the reaction carried out at a temperature of about 5–80° C. and more advantageously about 40–60° C. Higher temperatures above 80° C. usually result in higher sulfone formation. Reaction times are in the order of 2–8 hours and more commonly 4–6 hours. The reaction medium also includes an emulsifier or suspending agent for the polymer in addition to the sulfone inhibitor and sulfonating agent. This suspending agent is not essential in decreasing sulfone formation, but does permit the aromatic polymer to be added all at once rather than a gradual addition characteristic of some other processes.

The reaction medium represents the sulfonating agent, sulfone inhibitor and other components present such as the suspending agent. In some instances, semi-solvents will also be utilized.

The sulfonating agent is milder than $SO_3$ to limit sulfone formation and is based on a concentrated sulfuric acid such as sulfuric acid, oleum, sulfonic acid and the like. Advantageously, the acid is concentrated sulfuric acid or oleum. In some instances, it may be preferable to form these in situ with the use of $SO_3$ and sulfuric acid or oleum.

The particular sulfone inhibitor useful in this invention is a phosphoric acid. Suitable acids include the several phosphoric acids and their partial esters or other products from the partial reaction of the acidic groups with organic reactants. The ortho, meta, pyro or polymeric forms of phosphoric acid are normally preferred. The inhibitor is usually present in the order of about 5–15% by weight of the total.

The emulsifier or suspending agent for the polymer may be selected from several useful agents. Usually, an alkylaryl sulfonic acid or an acid phosphate ester such as an alkyl, aryl, or aralkyl acid phosphate provides very useful results. The acid phosphates are preferred and particularly bis(dipropylene glycol) phosphoric acid.

Upon completion of the reaction the entire contents of the reaction vessel usually are water soluble as indicated by the introduction of a sample into water to produce a clear solution. In a later stage, the polymer recovered from the sulfonating medium also illustrates this property. Therefore the process may be characterized as producing essentially quantitative yields of a water soluble sulfonated polymer.

One advantageous technique for recovering the water soluble sulfonated polymer is by forming a precipitate of the water soluble polymer by cooling. In this method, the contents of the reaction vessel are added to chilled water wherein the polymer precipitates. The precipitate is recovered by filtration and redissolved in water for purposes of further purification. This water solution is then dialyzed through a cellophane membrane until no more sulfate is visible in the effluent as indicated by a barium chloride test. The resulting solution is relatively free of sulfuric acid and phosphoric acid and is then neutralized with sodium hydroxide. Evaporation is carried out to recover the resulting salt sodium polystyrene sulfonate. Yields based on the purified salt are commonly in the order of 30–80%.

The process is useful for preparing various salts of the water soluble sulfonates. Illustrative salts include the ammonium salts, monovalent ammonium alkali metal salts such as sodium, potassium, lithium and the like.

The following example, illustrates one embodiment of this invention. It is to be understood that this is for illustrative purposes only and does not purport to be wholly definitive to conditions or scope.

EXAMPLE I

A 2 liter three neck reaction flask equipped with a stirrer, thermometer, dropping funnel and calcium chloride drying tube was charged with approximately 500 ml. of 96% sulfuric acid, 100 ml. of 110–112% phosphoric acid, and 2.5 gm. of bis (dipropylene glycol) phosphoric acid. About 52 gm. of polystyrene (molecular weight approximately 253,000 by DSV) was added to the flask and formed a suspension. This suspension was then heated with agitation to about 50° C. using a mantle. At this temperature, about 320 gm. of 20% fuming sulfuric acid was added at such a rate that the temperature did not exceed approximately 60° C. After maintaining this mixture at 50–60° C. for four hours a small portion (approximately 2 gm.) was removed and dissolved completely in 100 ml. of water to form a clear solution. This indicated sulfonation to a completely water soluble product in near quantitative yields. At this point the entire reaction mixture was slowly poured into 1200 ml. of rapidly stirred chilled water. The polymer partially precipitated and the entire mixture was cooled to 5° C. complete to precipitation. The precipitated polymer was then filtered through glass cloth.

270 gm. of the solid precipitated polymer was collected and dissolved in 2 liters of deionized water. This solution of polystyrene sulfonic acid, sulfuric acid, and phosphoric acid was dialyzed through a cellophane membrane until the effluent water showed very little sulfate. This solution was then neutralized with 27.0 gm. of 50% sodium hydroxide, dried on a steam bath, ground to a fine off white powder, and finally dried to constant weight in a vacuum oven (70° C.–1″ Hg pressure). Elemental analyses indicated 79.5% sulfonated polymer. This polymer was completely water soluble.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

What is claimed:

1. A process for preparing water soluble polystyrene sulfonates which comprises subjecting polystyrene suspended in a liquid reaction medium to a temperature of about 5–80° C. for 2–8 hours, diluting the reaction mixture with water, cooling the mixture to precipitate the sulfonated polystyrene, redissolving the precipitated sulfonated polystyrene in water and subjecting the solution to dialyzation to remove the sulfonated polystyrene, said liquid reaction medium consisting essentially of a sulfonating agent selected from the group consisting essentially of sulfuric acid, oleum and sulfonic acid, a phosphoric acid as a sulfone formation inhibitor, and an acid phosphate ester suspending agent, the phosphoric acid being present in about 5–15 percent by weight based upon the weight of the total reaction mixture.

2. The process of claim 1 wherein oleum is the sulfonating agent.

3. The process of claim 1 wherein the suspending agent is bis (dipropylene glycol) phosphoric acid.

4. The process of claim 1 wherein the polystyrene has a molecular weight of 10,000–3,000,000 as determined by DSV.

5. The process of claim 4 wherein oleum is the sulfonating agent and ortho-, meta-, or pyro-phosphoric acid or mixtures thereof is the sulfone inhibitor.

References Cited

UNITED STATES PATENTS

| | | | |
|---|---|---|---|
| 3,072,618 | 1/1963 | Turbak | 260—79.3 |
| 3,205,285 | 9/1965 | Turbak et al. | 260—79.3 |
| 3,393,160 | 7/1968 | Corte et al. | 260—79.3 |
| 2,809,960 | 10/1957 | Roth | 260—686 |
| 3,056,765 | 10/1962 | Cowherd et al. | 260—79.3 |

JAMES A. SEIDLECK, Primary Examiner

U.S. Cl. X.R.

260—29.6